United States Patent
Engelkemier et al.

(10) Patent No.: US 11,681,596 B1
(45) Date of Patent: Jun. 20, 2023

(54) REDUNDANT SEGMENT FOR EFFICIENT IN-SERVICE TESTING

(71) Applicant: Ethernovia Inc., San Jose, CA (US)

(72) Inventors: Darren S. Engelkemier, Menlo Park, CA (US); Hossein Sedarat, San Jose, CA (US); Roy T. Myers, Jr., Morgan City, CA (US); Ramin Shirani, Morgan Hill, CA (US)

(73) Assignee: Ethernovia Inc., San Jose, CA (US)

(*) Notice: Subject to any disclaimer, the term of this patent is extended or adjusted under 35 U.S.C. 154(b) by 0 days.

(21) Appl. No.: 17/451,051

(22) Filed: Oct. 15, 2021

Related U.S. Application Data

(60) Provisional application No. 63/092,246, filed on Oct. 15, 2020.

(51) Int. Cl.
  *G06F 11/27* (2006.01)
  *G06F 11/267* (2006.01)
  *G06F 11/263* (2006.01)

(52) U.S. Cl.
  CPC .......... *G06F 11/27* (2013.01); *G06F 11/263* (2013.01); *G06F 11/267* (2013.01)

(58) Field of Classification Search
  CPC ....... G06F 11/263; G06F 11/267; G06F 11/27
  USPC ...................................... 714/10–12
  See application file for complete search history.

(56) References Cited

U.S. PATENT DOCUMENTS

| | | | |
|---|---|---|---|
| 4,967,347 A * | 10/1990 | Smith ................. | G06F 11/2215 714/E11.069 |
| 10,810,079 B2 | 10/2020 | Halbert et al. | |
| 2005/0106713 A1 | 5/2005 | Phan et al. | |
| 2014/0013182 A1 | 1/2014 | Cheng et al. | |
| 2015/0332463 A1 | 11/2015 | Galera et al. | |
| 2017/0139761 A1 | 5/2017 | Song et al. | |
| 2017/0272102 A1 | 9/2017 | Goldenberg et al. | |
| 2018/0322008 A1 | 11/2018 | Chung et al. | |

(Continued)

FOREIGN PATENT DOCUMENTS

| | | |
|---|---|---|
| CN | 107085648 | 8/2017 |
| WO | 2019142484 | 7/2019 |

OTHER PUBLICATIONS

US 2022/0035363 A1, 02/2022, Engelkemier et al. (withdrawn)

(Continued)

*Primary Examiner* — Joseph R Kudirka
(74) *Attorney, Agent, or Firm* — Schwegman Lundberg & Woessner, P.A.

(57) ABSTRACT

Disclosed are systems and methods for providing in-service testing using a redundant segment. A device (e.g., memory, filter, GPU) is implemented as multiple device segments. For example, a filter including 1024 taps may be implemented as sixteen smaller filter segments that include 64 taps each. A redundant segment that is of similar size to the device segments is used to provide in-service testing of the individual device segments. For example, the redundant segment is provided the same input as a device segment and the output of the redundant segment and the device segment are compared to determine whether the device segment is operating correctly. Multiplexers are used to cycle use of the redundant segment to provide in-service testing of each of the device segments. For example, the multiplexers can be configured into different modes to provide for testing of the various device segments.

22 Claims, 10 Drawing Sheets

(56) References Cited

U.S. PATENT DOCUMENTS

2020/0004627 A1   1/2020  Sharon et al.
2020/0043256 A1   2/2020  Rocci et al.
2020/0364958 A1  11/2020  Lewis et al.
2021/0049068 A1   2/2021  Schaefer et al.

OTHER PUBLICATIONS

"U.S. Appl. No. 17/132,556, Non Final Office Action dated Jun. 16, 2022", 11 pgs.
"U.S. Appl. No. 17/451,049, Non Final Office Action dated Sep. 2, 2022", 13 pgs.
"U.S. Appl. No. 17/132,556, Response filed Sep. 16, 2022 to Non Final Office Action dated Jun. 16, 2022", 11 pgs.
Lim, Seung-Ho, "A Stepwise Rate-Compatible LDPC and Parity Management in NAND Flash U Memory-Based Storage Devices", IEEE Access, vol. 8, pp. 162491-162506, 2020, 16 pgs.
"U.S. Appl. No. 17/451,049, Response filed Dec. 1, 2022 to Non Final Office Action dated Sep. 2, 2022", 12 pgs.
"U.S. Appl. No. 17/132,556, Notice of Allowance dated Dec. 21, 2022", 8 pgs.
"U.S. Appl. No. 17/132,556, Corrected Notice of Allowability dated Jan. 5, 2023", 2 pgs.
"U.S. Appl. No. 17/451,049, Notice of Allowance dated Jan. 17, 2023", 10 pgs.

\* cited by examiner

REDUNDANT SEGMENT FOR EFFICIENT IN-SERVICE TESTING

CROSS-REFERENCE TO RELATED APPLICATIONS

The present application claims the benefit of priority of U.S. Provisional Application No. 63/092,246, filed on Oct. 15, 2020, which is incorporated herein by reference in its entirety.

TECHNICAL FIELD

An embodiment of the present subject matter relates generally to functional safety, and more specifically, to a redundant segment for in-service testing.

BACKGROUND

Certain electronic applications, such as safety-critical automotive applications, have stringent demands for functional safety and reliability. To meet these increasingly stringent demands, testing is routinely performed to ensure long-term device reliability. For example, some or all logic or memories on a semiconductor may be tested at device or system boot to ensure that output generated by the components matches an expected known good value.

Ideally, testing would be conducted when a device is "in-service" to detect any real-time failures, however testing in-service is often not currently feasible as test patterns typically interfere with the normal functional behavior and can create large power spikes that may not be acceptable or supported by the system. Adding fully redundant hardware is also not practical in most applications, such as automotive systems, due to the significant cost and power usage associated with doing so. Accordingly, improvements are needed.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1A:
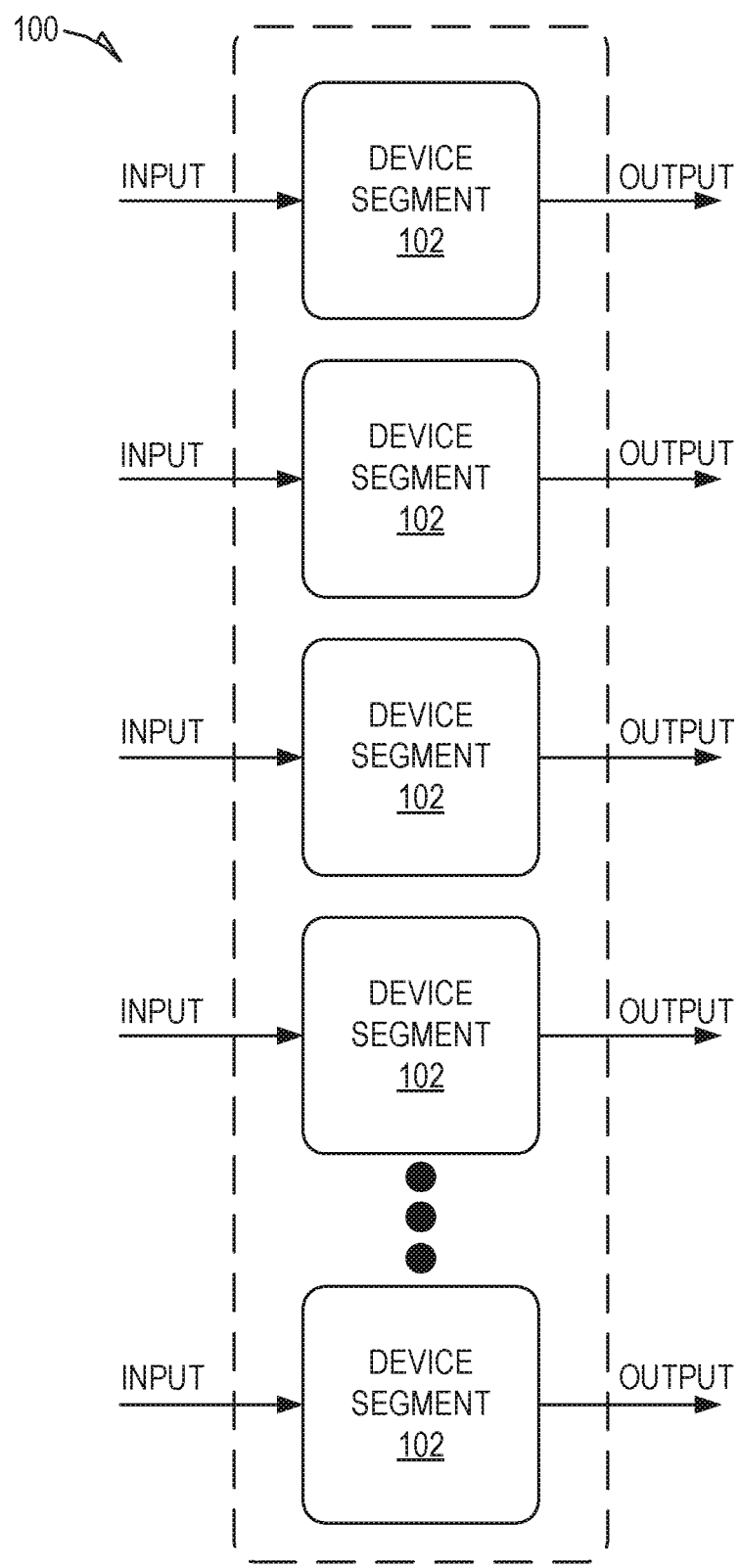
FIGS. 1A and 1B are block diagrams of devices implemented as multiple device segments, according to certain example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems and methods for providing in-service testing using a redundant segment. As explained earlier, in-service testing is often not currently feasible as test patterns typically interfere with normal functional behavior and can create large power spikes that may not be acceptable or supported by the system. Further, adding fully redundant hardware is also not practical in most applications, such as automotive systems, due to the significant cost and power usage associated with doing so.

To alleviate these issues, a device (e.g., storage, memory, filter, compute, GPU, and the like) is implemented as multiple device segments of equal size and tested using a similarly sized redundant segment. For example, a filter including 1024 taps may be implemented as four smaller filter segments that include 256 taps each, or sixteen smaller filter segments that include 64 taps each. As another example, a storage (e.g., memory) that is 512 Megabits (Mb) can be implemented as four smaller storage segments that are 128 Mb each, or sixteen smaller storage segments that are 32 Mb each.

A redundant segment that is of similar size to the device segments is used to provide in-service testing of the individual device segments. For example, the redundant segment is provided the same input as a device segment and the output of the redundant segment and the device segment are compared to determine whether the device segment is operating correctly. Multiplexers are used to provide in-service testing of each of the device segments. For example, the multiplexers can be configured into different modes to cause the redundant segment to provide in-service testing of the various device segments.

Implementing a device as multiple smaller device segments reduces the cost and power consumption associated with in-service testing by reducing the size of the redundant segment. That is, the redundant segment used for in-service testing is of similar or equal size of the device segments rather than the size of the much larger device. For example, implementing a device as sixteen smaller device segments allows for use of a redundant segment that is one sixteenth the size of the device to provide in-service testing. Reducing the size of the redundant segment greatly reduces both the cost and power consumption associated with in-service testing. This also allows for in-service testing to be provided continuously to check performance of the various device segments without interrupting operation of the device or implemented system. For example, the redundant segment can be used to continuously check the device by repeatedly rotating through each device segment while in-service.

Figure 1B:
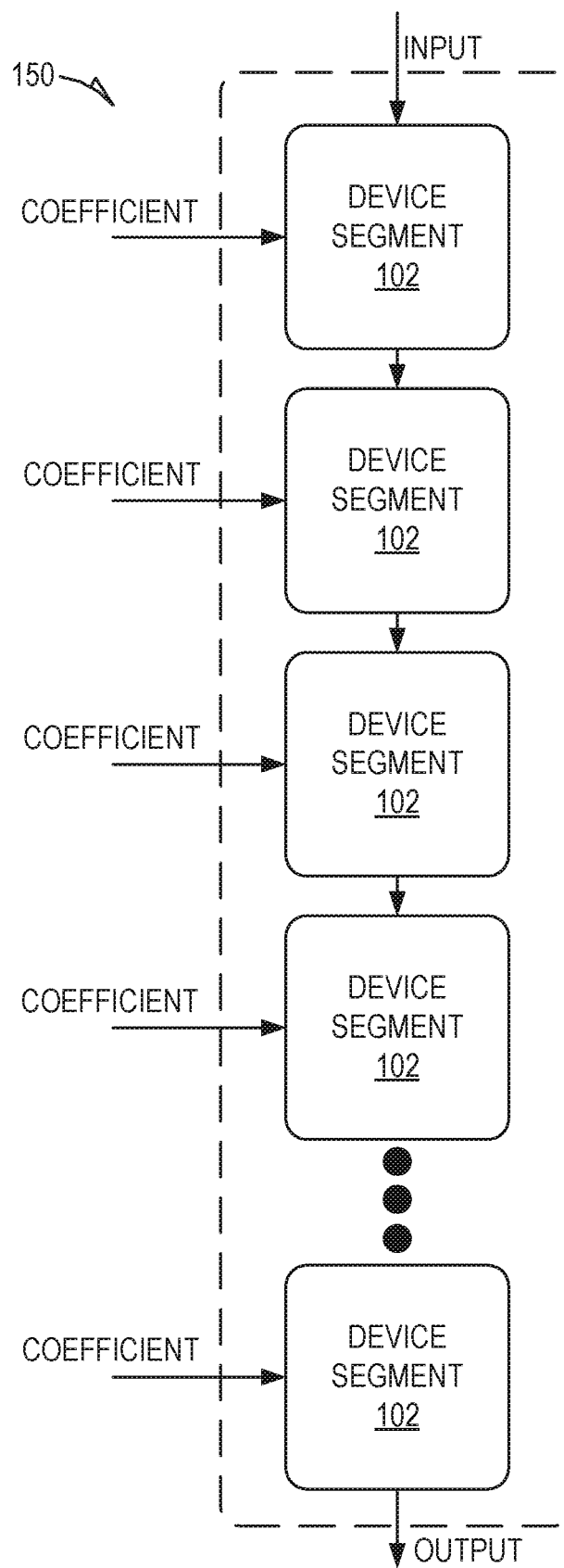

FIGS. 1A and 1B are block diagrams of devices implemented as multiple device segments, according to certain example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIGS. 1A and 1B. However, a skilled artisan will readily recognize that various additional functional components may be supported to facilitate additional functionality that is not specifically described herein.

FIG. 1A shows an example, of a device 100 implemented as multiple device segments 102. Although the device 100 is shown as including only five device segments 102, this is only one example and is not meant to be limiting. The device 100 may be comprised of any number of the device segments 102. Further, each device segment 102 may be implemented to be equal or similar in size.

As shown, each device segment 102 of the device 100 may operate independently from each other. For example, each device segment 102 may receive an external input and generate an external output for the device 100. This type of embodiment may be used for devices 100 such as a storage (e.g., memory), compute (e.g. Graphical Processing Unit (GPU)), and the like, in which each portion of the device 100 may operate independently from each other. For example, a request to read or write data to/from a particular address in memory may be directed to the device segment 102 that maintains that particular address.

FIG. 1B shows another example of a device 150 implemented as multiple device segments 102. In contrast to the device 100 shown in FIG. 1A in which the device segments 102 operate independently from each other, in FIG. 1B the device segments 102 are ordered sequentially such that the external input to device 150 is received by the device segment 102 that is ordered sequentially first in the device 150 and an external output of the device 150 is generated by the device segment 102 that is ordered sequentially last in the device 150. The output generated by the other device segments 102 in the device 150 are provided as input to the next sequentially ordered device segment 102 in the device 150. This type of embodiment can be used to implement a filter as multiple device segments 102. For example, an input received by the filter is processed by each device segment 102 in sequential order to filter out noise from a signal. In this type of embodiment, each device segment 102 may receive a coefficient input that configures the coefficient values used by the device segment 102 to filter a portion of the signal.

Figure 2A:
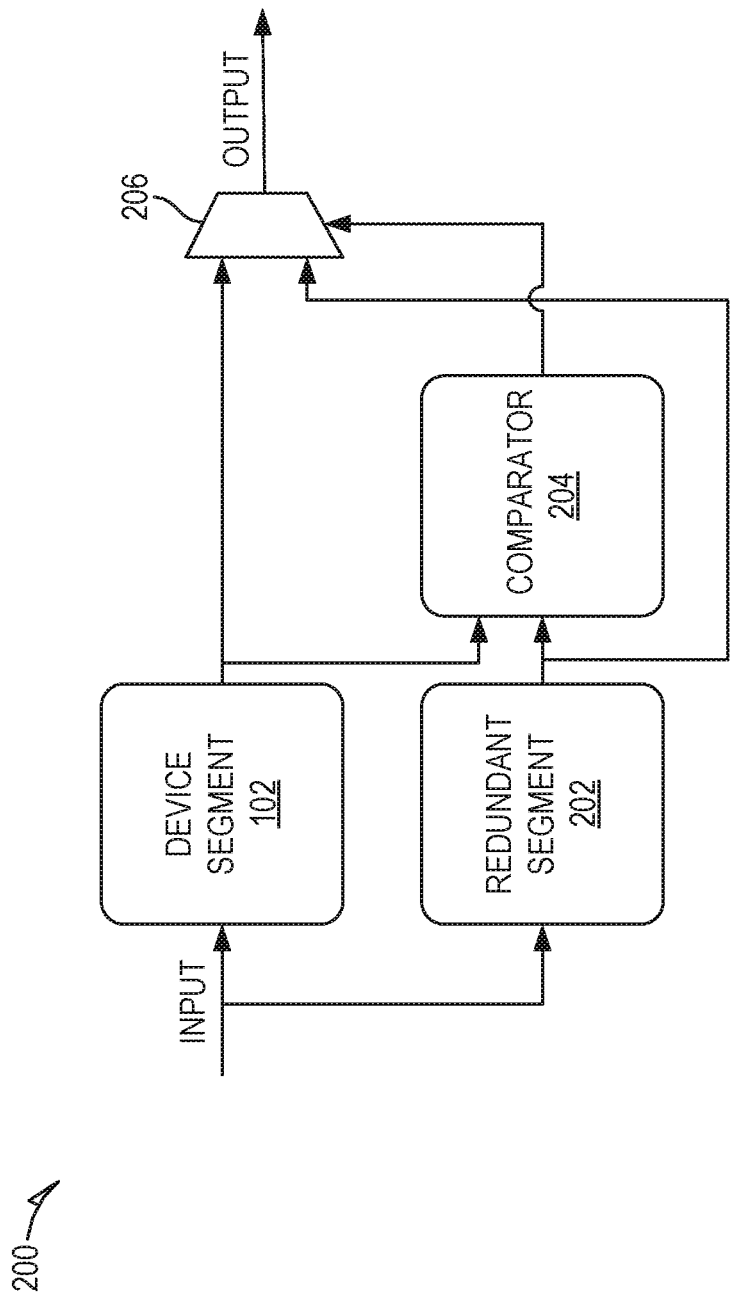
FIGS. 2A and 2B are block diagrams of systems for in-service testing of a device segment using a redundant segment, according to some example embodiments.
Figure 2B:
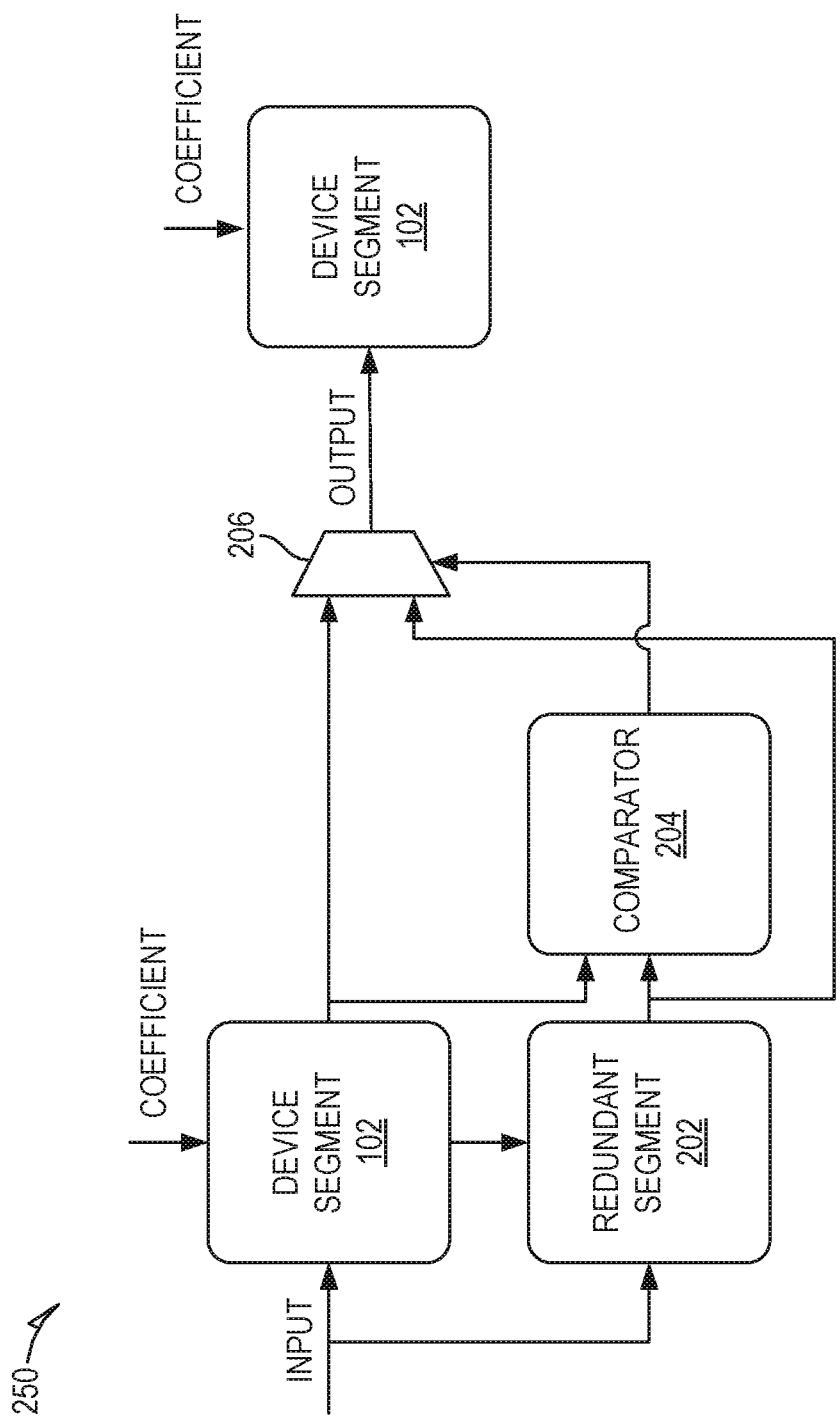

FIGS. 2A and 2B are block diagrams of systems for in-service testing of a device segment 102 using a redundant segment 202, according to some example embodiments. In the system 200 shown in FIG. 2A, the input received at a device segment 102 is also provided to a redundant segment 202 for in-service testing of the device segment 102. Both the redundant segment 202 and the device segment 102 generate an output based on the input. The outputs generated by the device segment 102 and the redundant segment 202 are provided as input to both a comparator 204 and an output selector 206.

The comparator 204 compares the output generated by the device segment 102 and the output generated by the redundant segment 202 and generates an output determination indicating whether the two outputs match or do not match. The output determination generated by the comparator 204 is provided as a control input to the output selector 206. The output selector 206 selects to output either the output generated by the device segment 102 or the output generated by the redundant segment 202 based on the output determination received from the comparator 204. For example, the output selector 206 may be a multiplexer that outputs either the output generated by the device segment 102 or the output generated by the redundant segment 202 based on the output determination received from the comparator 204. The output selector 206 selects the output generated by the device segment 102 if the determination received from the comparator 204 indicates that the output generated by the device segment 102 matches the output generated by the redundant segment 202. Alternatively, the output selector 206 selects the output generated by the redundant segment 202 if the determination received from the comparator 204 indicates that the output generated by the device segment 102 does not match the output generated by the redundant segment 202.

In the system 250 shown in FIG. 2B, the device segments 102 are implemented as part of a filter. As shown, the device segment 102 receives both an input and a coefficient input that configures the coefficient values used by the device segment 102 to filter a portion of the signal. Both the input and the coefficient input received at a device segment 102 are provided to a redundant segment 202 for in-service testing of the device segment 102. Both the redundant segment 202 and the device segment 102 generate an output based on the input and the coefficient input. The outputs generated by the device segment 102 and the redundant segment 202 are provided as input to both a comparator 204 and an output selector 206.

The comparator 204 compares the output generated by the device segment 102 and the output generated by the redundant segment 202 and generates an output determination indicating whether the output generated by the device segment 102 and the output generated by the redundant segment 202 match or do not match. The output determination generated by the comparator 204 is provided as a control input to the output selector 206. The output selector 206 selects to output either the output generated by the device segment 102 or the output generated by the redundant segment 202 based on the determination output received from the comparator 204. For example, the output selector 206 selects the output generated by the device segment 102 if the determination output received from the comparator 204 indicates that the output generated by the device segment 102 matches the output generated by the redundant segment 202. Alternatively, the output selector 206 selects the output generated by the redundant segment 202 if the determination output received from the comparator 204 indicates that the output generated by the device segment 102 does not match the output generated by the redundant segment 202.

Figure 3A:
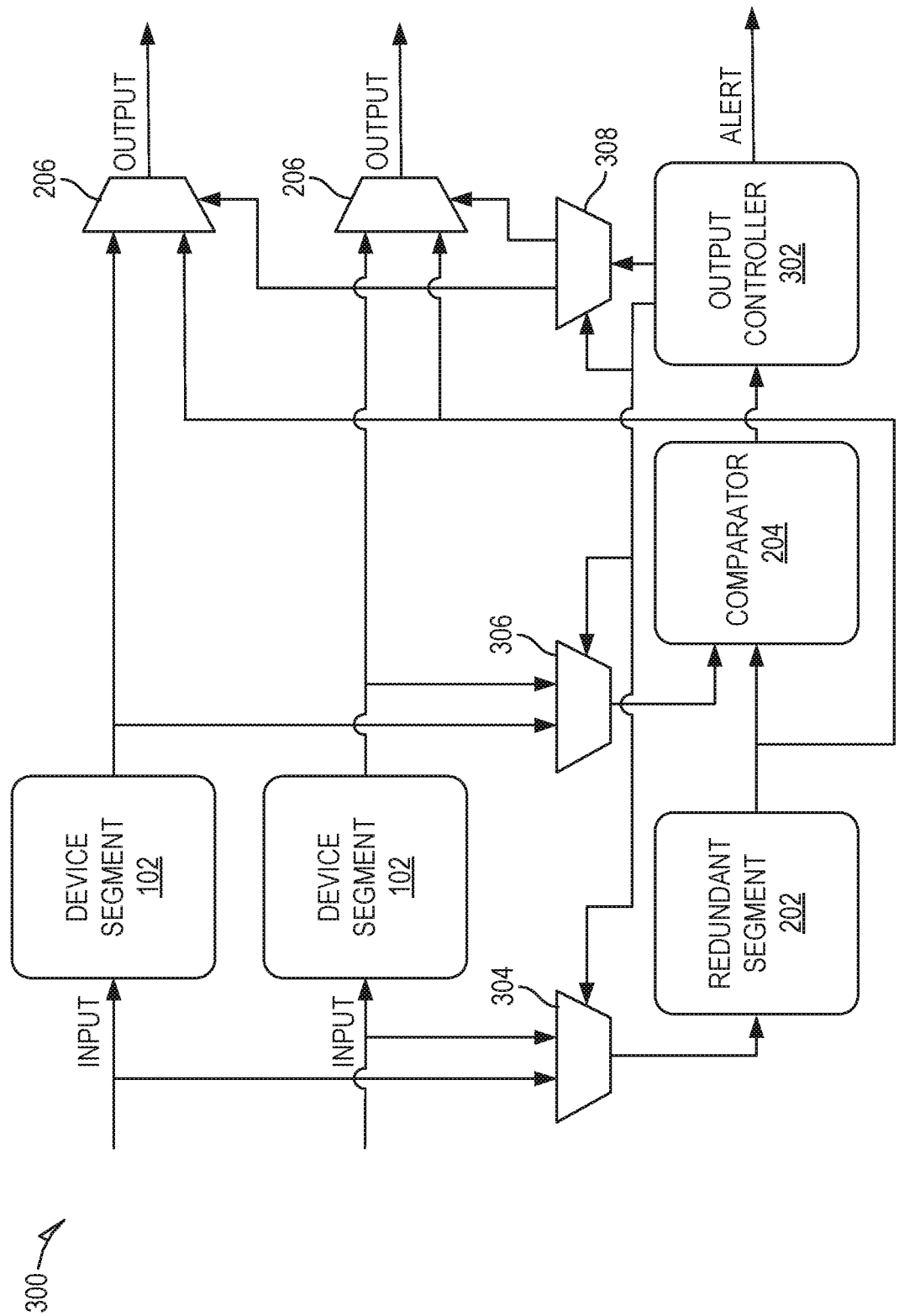
FIGS. 3A and 3B are block diagrams of a system for in-service testing of multiple device segments using a redundant segment, according to some example embodiments.
Figure 3B:
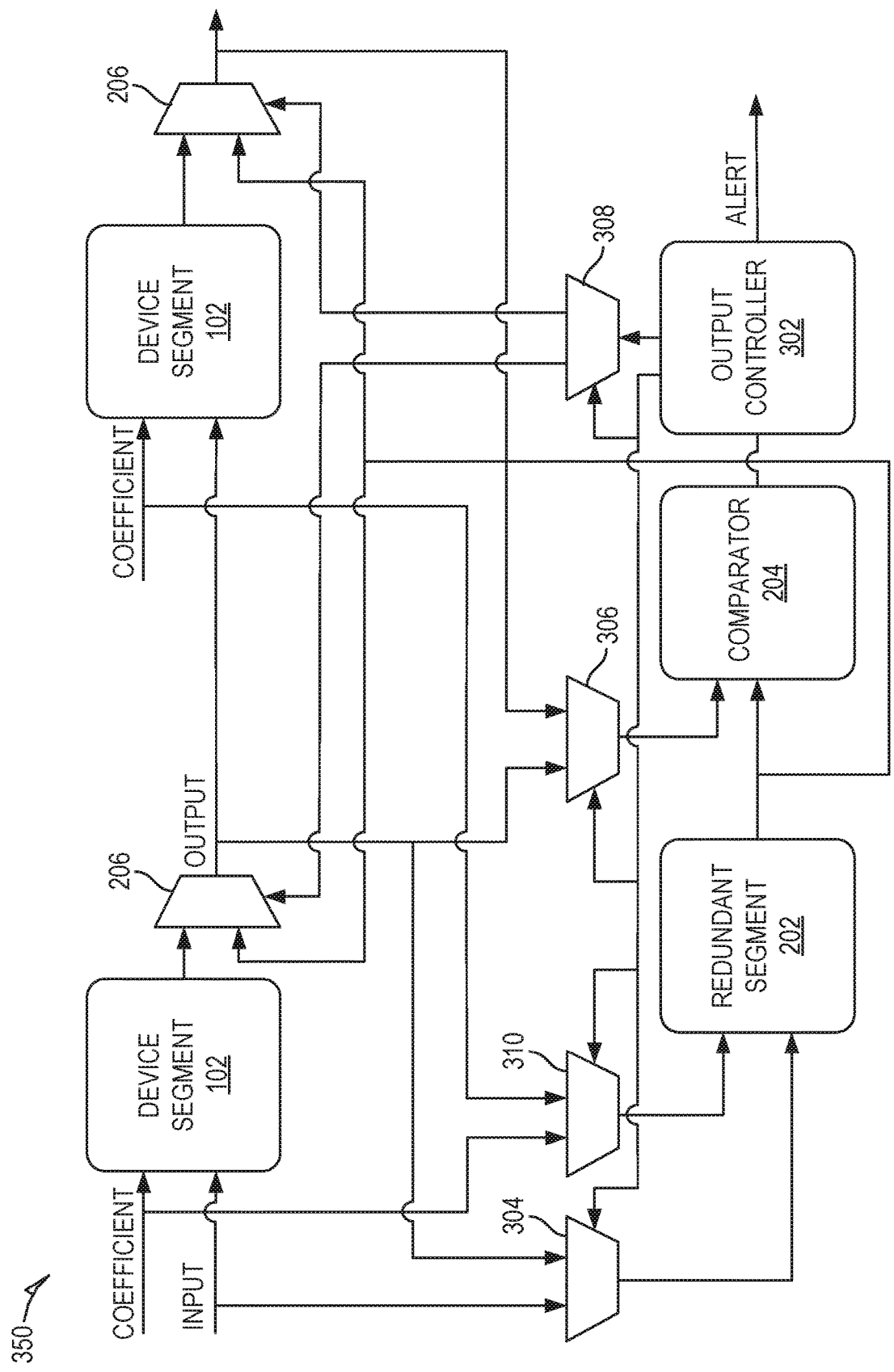

FIGS. 3A and 3B are block diagrams of systems for in-service testing of multiple device segments 102 using a redundant segment 202, according to some example embodiments. As shown in FIG. 3A, the system 300 includes a segment input selector 304, a segment output selector 306, and an output determination selector 308. Each of the segment input selector 304, the segment output selector 306, and the output determination selector 308 may be a multiplexer that is configurable into different modes to rotate in-service testing of the device segments 102 in the system 300. The segment input selector 304 receives the input received by each of the device segments 102 and provides one of the inputs to the redundant segment 202. Similarly, the segment output selector 306 receives the output generated by each of the device segments 102 and provides one of the outputs to the comparator 204. The output determination selector 308 receives the output determination generated by the comparator 204 and provides it to one of the output selectors 206.

The output controller 302 provides a control signal to the segment input selector 304, the segment output selector 306, and the output determination selector 308 to configure each into various modes to rotate in-service testing of the device segments 102 in the system 300. The control signal configures each of the segment input selector 304, the segment output selector 306, and the output determination selector 308 into various modes to provide the appropriate outputs for in-service testing of one of the device segments 102. For example, the control signal may cause the segment input selector 304 to provide the input received by a particular device segment 102 to the redundant segment 202 and cause the segment output selector 306 to provide the output generated by the same device segment 102 to the comparator 204 for in-service testing of the particular device segment. The control signal may also cause the output determination selector 308 to provide the output determination generated by the comparator 204 to the output selector 206 for the same device segment 102.

The output controller 302 uses the control signal to modify the mode of the segment input selector 304, the segment output selector 306, and the output determination selector 308 to rotate in-service testing of the device segments 102 in the system 300. For example, the output controller 302 may rotate the in-service testing according to a predetermined cycle. Accordingly, a single redundant segment 202 may be used to provide for continuous in-service testing of multiple device segments 102.

In addition to rotating in-service testing of the device segments 102, the output controller 302 may also facilitate replacement of a device segment 102 by the redundant segment 202. As shown, the output controller 302 receives the output determination generated by the comparator 204. If the output determination indicates that the output generated by a device segment 102 does not match the output generated by the redundant segment 202, the output controller 302 may cause the redundant segment 202 to replace the device segment 102. For example, the output controller 302 may configure the segment input selector 304 to continuously provide the input received by the device segment 102 to the redundant segment 202 and cause the output selector 206 to continuously output the output generated by the redundant segment 202. This effectively replaces the device segment 102 with the redundant segment 202. In this type of situation, in-service testing of the other device segments 102 may be halted or resumed using other redundant segments 202, if available.

The output controller 302 may also be configured to generate an alert in the event that the output determination indicates that the output generated by a device segment 102 does not match the output generated by the redundant segment 202. For example, the alert may cause a warning light or other notification to be triggered indicating that an error was detected with respect to one of the device segments 102.

Although the comparator 204 is shown as providing the output determination to the output controller 302, this is just one embodiment and is not meant to be limiting. In some embodiments, the comparator 204 provides the output determination to the output determination selector 308 directly. Further, although the system 300 is shown as including only two device segments 102, this is just one embodiment and is not meant to be limiting. The system 300 may include any number of device segments 102 and the described functionality may be used to provide in-service testing of the device segments 102.

FIG. 3B shows another embodiment in which a filter is implemented as multiple device segments 102. In contrast to the system 300 shown in FIG. 3A, the system 350 shown if FIG. 3B includes a coefficient selector 310 in addition to the segment input selector 304, the segment output selector 306, and the output determination selector 308. The coefficient selector 310, like the segment input selector 304, the segment output selector 306, and the output determination selector 308, is a multiplexer that is configurable into different modes to rotate in-service testing of the device segments 102. The coefficient selector 310 receives the coefficient input received by each of the device segments 102 and provides one of the coefficient inputs to the redundant segment 202 for in-service testing of the corresponding device segment 102. The coefficient selector 310, like the segment input selector 304, the segment output selector 306, and the output determination selector 308, is controlled by the control signal provided by the output controller 302.

Figure 4:
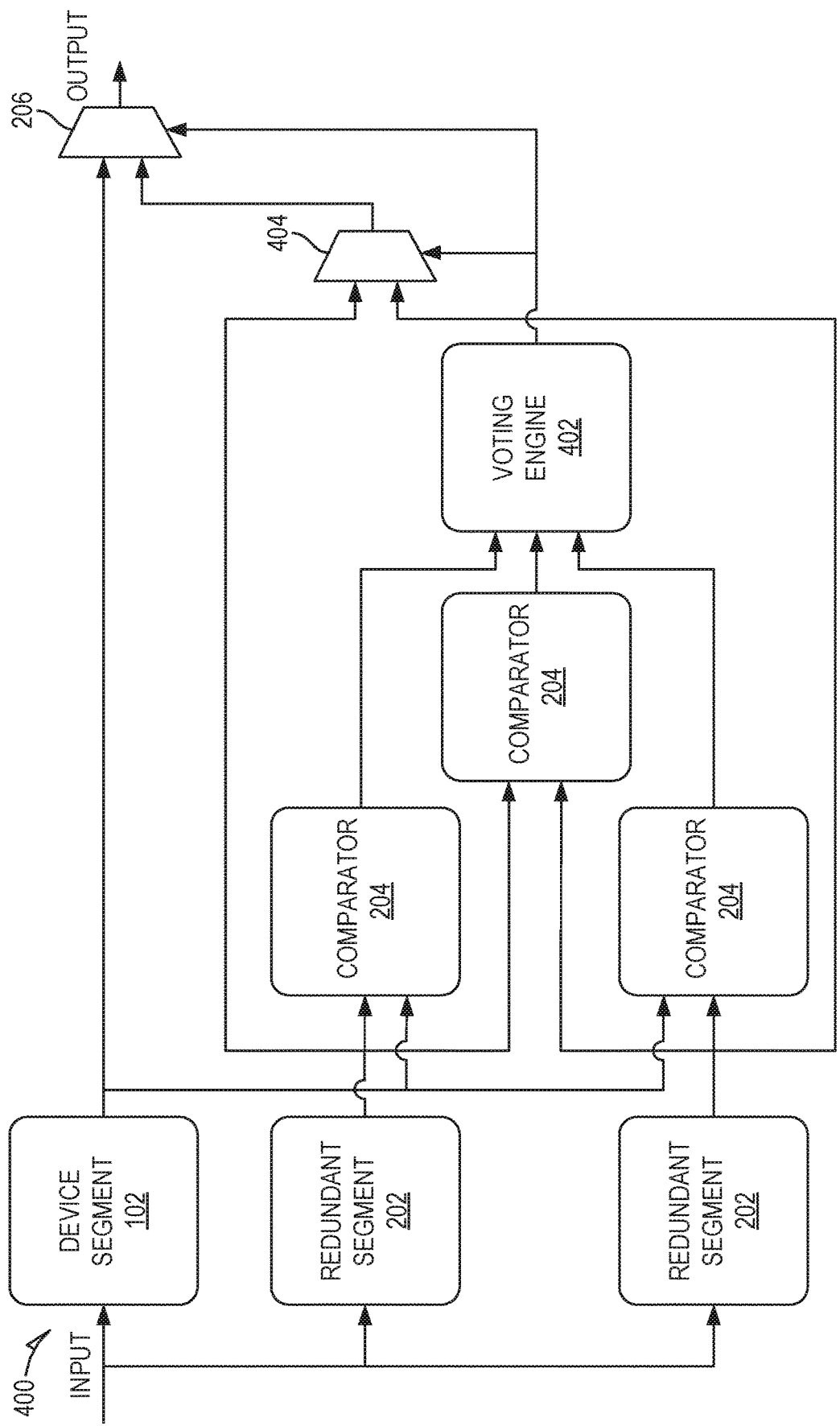
FIG. 4 is a block diagram of a system for in-service testing using multiple redundant segments, according to some example embodiments.

FIG. 4 is a block diagram of a system 400 for in-service testing using multiple redundant segments 202, according to some example embodiments. As shown, the input received by the device segment 102 is provided to both redundant segments 202. Each redundant segment 202 generates an output based on the received input. Three comparators 204 are used to compare the outputs generated by the device segment 102 and the two redundant segments 202. For example, the first comparator 204 compares the output generated by the device segment 102 and the first redundant segment 202, the second comparator 204 compares the output generated by the device segment 102 and the second redundant segment 202, and the third comparator 204 compares the outputs generated by the two redundant segments 202.

Each of the comparators 204 generates an output determination based on its received input. The output determinations generated by each comparator 204 are then provided to the voting engine 402. In turn, the voting engine 402 generates a voting output based on the output determinations received from the comparators 204. The voting output indicates which output should be selected based on the comparisons performed by the comparators 204. For example, the voting engine 402 determine whether the output generated by the device segment 102 or by one of the redundant segments 202 should be output.

The voting engine 402 determines which output to select based on whether an output matches at least one of the other outputs. For example, if the output generated by the device segment 102 matches the outputs generated by both redundant segments 202, the voting engine 402 may select to use the output of the device segment 102 or the output generated by either of the redundant segments 202. Selecting the output of the device segment 102 allows for the redundant segments 202 to be used to provide in-service testing or replacement of other device segments 102.

Alternatively, if the output generated by the device segment 102 matches an output generated by one of the redundant segments 202 but does not match the output generated by the other redundant segment 202, the voting engine 402 may select to use the output generated by the device segment 102 or the redundant segment 202 that generated the matching output. Selecting use of the output generated by the device segment 102 allows for the redundant segments 202 to be used to provide in-service testing or replacement of other device segments 102. In this type of situation, the redundant segment 202 that generated the non-matching output may be marked as faulty and/or otherwise be removed from use for in-service testing or replacement of the device segments 102.

If the output generated by the device segment 102 does not match the output generated by either of the redundant segments 202 but the outputs generated by the redundant segments 202 match each other, the voting engine 402 may select the output generated by either of the redundant segments 202.

The voting output generated by the voting engine 402 is provided as a control signal to both a redundant segment output selector 404 and an output selector 206. The redundant segment output selector 404 receives the outputs generated by each redundant segment 202 and outputs one of the two outputs based on the voting output provided by the voting engine 402. The output of the redundant segment output selector 404 is provided to the output selector 206 along with the output of the device segment 102. The output selector 206 provides an output based on the voting output generated by the voting engine 402.

Although the system 400 includes only two redundant segments 202, this is only one example and is not meant to be limiting. The system 400 may include any number of redundant segments 202 and other shown components to provide similar functionality.

Figure 5:
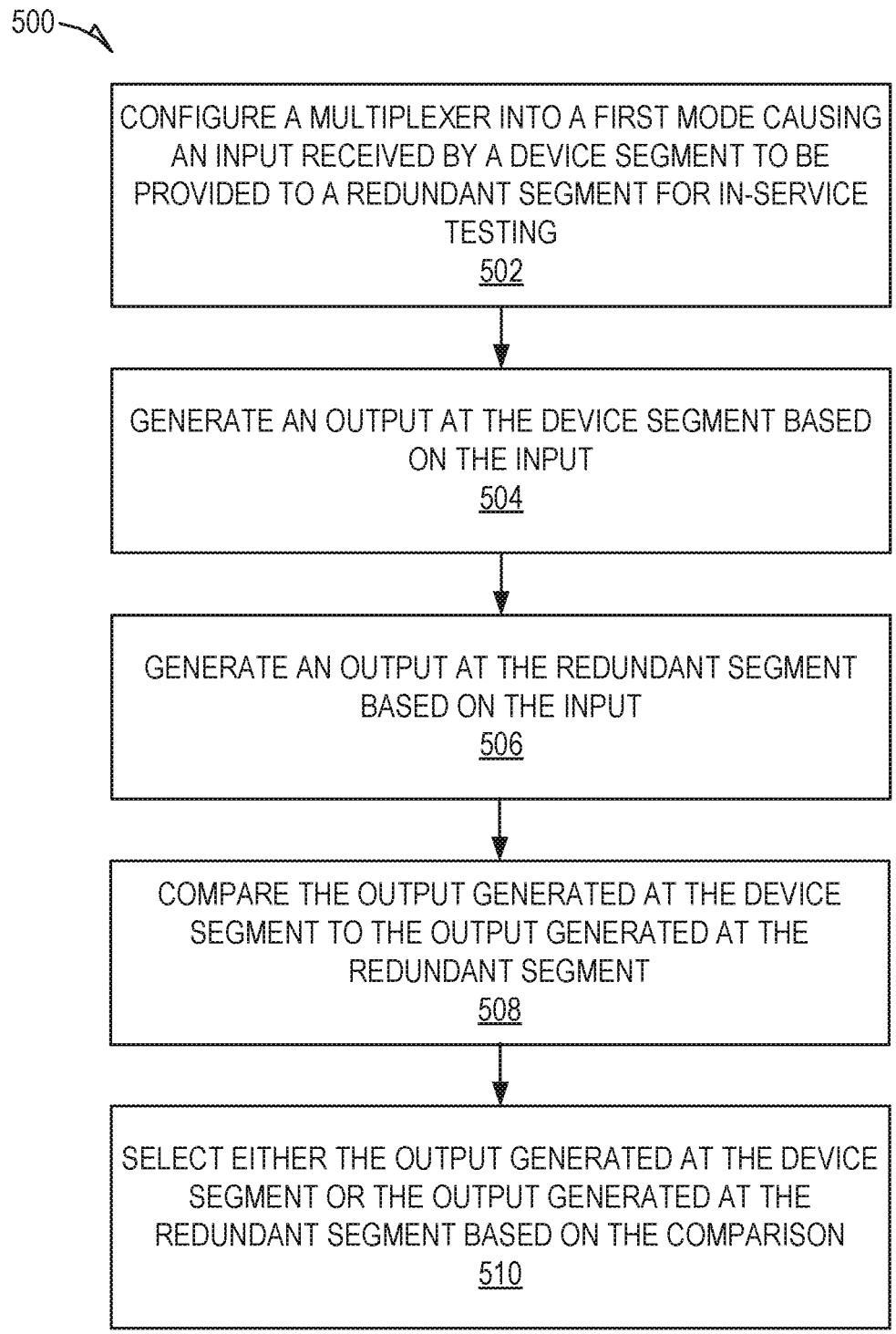
FIG. 5 is a flowchart showing a method for providing in-service testing using a redundant segment, according to some example embodiments.

FIG. 5 is a flowchart showing a method 500 for providing in-service testing using a redundant segment 202, according to some example embodiments At operation 502, the output controller 302 configures a multiplexer into a first mode causing an input received by a device segment 102 to be provided to a redundant segment 202 for in-service testing. The output controller 302 provides a control signal to the segment input selector 304, the segment output selector 306, and the output determination selector 308 to configure each into various modes to rotate in-service testing of the device segments 102 in the system 300. The control signal configures each of the segment input selector 304, the segment output selector 306, and the output determination selector 308 into various modes to provide the appropriate outputs for in-service testing of one of the device segments 102. For example, the control signal may cause the segment input selector 304 to provide the input received by a particular device segment 102 to the redundant segment 202 and cause the segment output selector 306 to provide the output generated by the same device segment 102 to the comparator 204 for in-service testing of the particular device segment. The control signal may also cause the output determination selector 308 to provide the output determination generated by the comparator 204 to the output selector 206 for the same device segment 102.

At operation 504, the device segment 102 generates an output based on the input.

At operation 506, the redundant segment 202 generates an output based on the input.

At operation 508, the comparator 204 compares the output generated at the device segment 102 to the output generated at the redundant segment 202. The comparator 204 compares the output generated by the device segment 102 and the output generated by the redundant segment 202 and generates an output determination indicating whether the two outputs match or do not match. The output determination generated by the comparator 204 is provided as a control input to the output selector 206.

At operation 510, the output selector 206 selects either the output generated at the device segment 102 or the output generated at the redundant segment 202 based on the comparison. The output selector 206 selects to output either the output generated by the device segment 102 or the output generated by the redundant segment 202 based on the output determination received from the comparator 204. For example, the output selector 206 may be a multiplexer that outputs either the output generated by the device segment 102 or the output generated by the redundant segment 202 based on the output determination received from the comparator 204. The output selector 206 selects the output generated by the device segment 102 if the determination received from the comparator 204 indicates that the output generated by the device segment 102 matches the output generated by the redundant segment 202. Alternatively, the output selector 206 selects the output generated by the redundant segment 202 if the determination received from the comparator 204 indicates that the output generated by the device segment 102 does not match the output generated by the redundant segment 202.

The method 500 shown in FIG. 5 may be continuously repeated to provide for in-service testing of each of the device segments 102. For example, the multiplexer may be reconfigured to provide for in-service testing of a subsequent device segment 102. This process may be repeated to cycle use of the redundant segment 202 to provide continuous in-service testing of the various device segments 102.

Software Architecture

Figure 6:
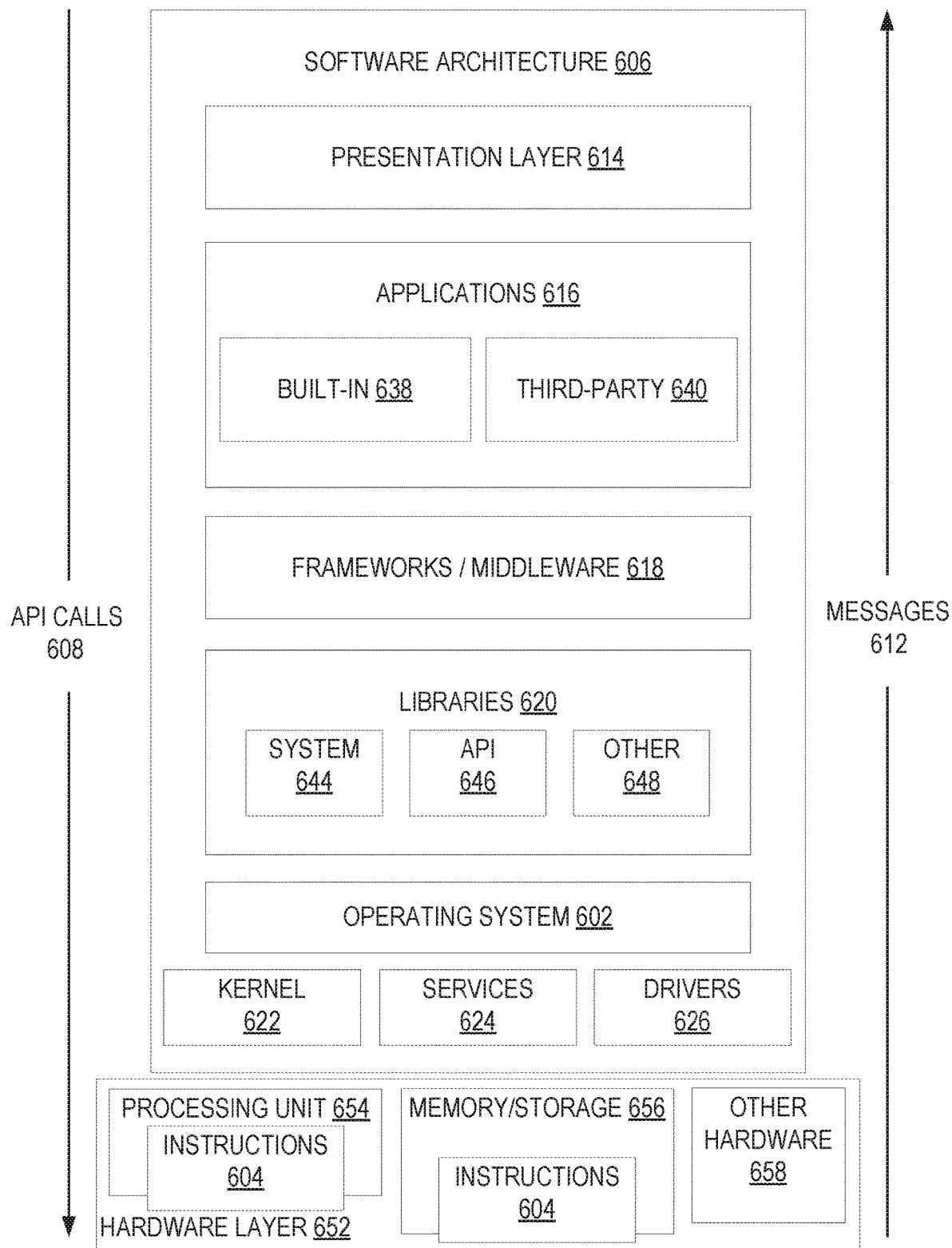
FIG. 6 is a block diagram illustrating an example software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules 656, which also have executable instructions 604. The hardware layer 652 may also comprise other hardware 658.

In the example architecture of FIG. 6, the software architecture 606 may be conceptualized as a stack of layers where each layer provides particular functionality, such as the Open Systems Interconnection model (OSI model). For example, the software architecture 606 may include layers such as an operating system 602, libraries 620, frameworks/middleware 618, applications 616, and a presentation layer 614. Operationally, the applications 616 and/or other components within the layers may invoke application programming interface (API) calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
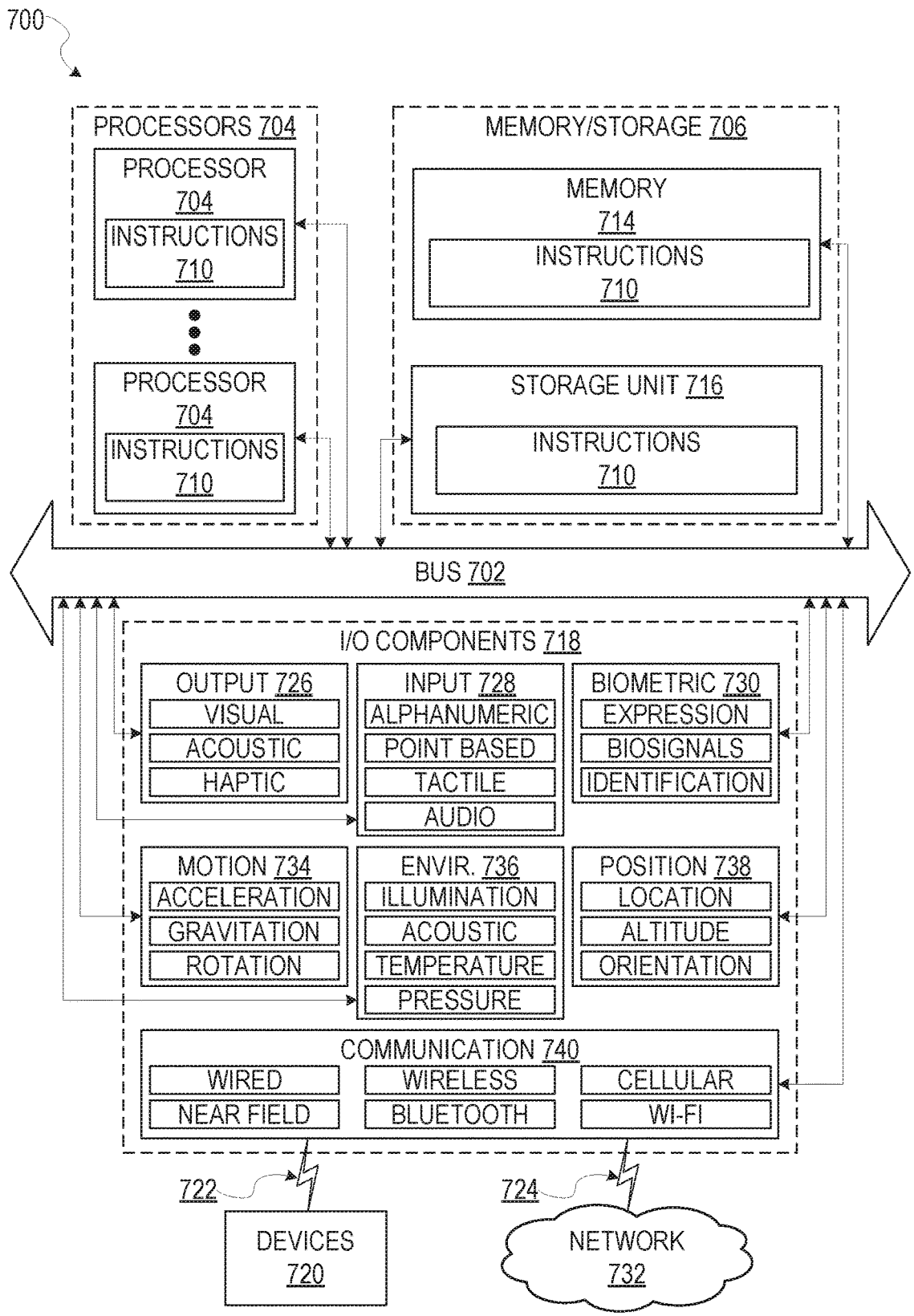
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor 704) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 704 may further be a multi-core processor having two or more independent processors 704 (sometimes referred to as "cores") that may execute instructions 710 contemporaneously.

What is claimed is:

1. A method comprising:
   configuring one or more multiplexers into a first mode, causing a first input received by a first device segment to be provided to a redundant segment for in-service testing of the first device segment, wherein the one or more multiplexers are configurable into a second mode for in-service testing of a second device segment;
   generating an output at the redundant segment based on the first input;
   generating an output at the first device segment based on the first input;
   comparing the output generated by the redundant segment to the output generated by the first device segment, yielding a first comparison; and
   selecting either the output generated by the redundant segment or the output generated by the first device segment based on the first comparison.

2. The method of claim 1, further comprising:
   configuring the one or more multiplexers into the second mode, causing a second input received by the second device segment to be provided to the redundant segment for in-service testing of the second device segment;
   generating a second output at the redundant segment based on the second input;
   generating a second output at the second device segment based on the second input;
   comparing the second output generated by the redundant segment to the second output generated by the second device segment, yielding a second comparison; and
   selecting either the second output generated by the redundant segment or the second output generated by the second device segment based on the second comparison.

3. The method of claim 1, wherein selecting either the output generated by the redundant segment or the output generated by the first device segment comprises:
   determining, based on the first comparison, that the output generated by the redundant segment matches the output generated by the first device segment; and
   selecting the output generated by the first device segment based on determining that the output generated by the redundant segment matches the output generated by the first device segment.

4. The method of claim 1, wherein selecting either the output generated by the redundant segment or the output generated by the first device segment comprises:
   determining, based on the first comparison, that the output generated by the redundant segment does not match the output generated by the first device segment; and
   selecting the output generated by the redundant segment based on determining that the output generated by the redundant segment does not match the output generated by the first device segment.

5. The method of claim 4, further comprising:
   causing the first device segment to be replaced by the redundant segment.

6. The method of claim 4, further comprising:
   generating an alert based on determining that the output generated by the redundant segment does not match the output generated by the first device segment.

7. The method of claim 1, wherein configuring the one or more multiplexers into the first mode causes the first input received by the first device segment to also be provided to a second redundant segment for in-service testing of the first device segment.

8. The method of claim 7, further comprising:
   generating an output at the second redundant segment based on the first input, wherein the first comparison is further based on the output generated by the second redundant segment.

9. The method of claim 8, wherein selecting either the output generated by the redundant segment or the output generated by the first device segment comprises:
   determining that the output generated by the first device segment does not match the output generated by the redundant segment or the output generated by the second redundant segment, and determining that the output generated by the redundant segment matches the output generated by the second redundant segment, yielding a second determination; and
   selecting the output generated by the redundant segment based on the second determination.

10. The method of claim 8, wherein selecting either the output generated by the redundant segment or the output generated by the first device segment comprises:
    determining that the output generated by the first device segment matches at least one of the output generated by the redundant segment or the output generated by the second redundant segment, yielding a second determination; and
    selecting the output generated by the first device segment based on the second determination.

11. The method of claim 1, further comprising:
    continuously reconfiguring the one or more multiplexers to provide for in-service testing of a plurality of device segments.

12. An electronic circuit comprising:
    a first device segment, a second device segment, and a redundant segment;
    one or more multiplexers configurable into a first mode and a second mode, wherein in the first mode the one or more multiplexers provide input received by the first device segment to the redundant segment for in-service testing of the first device segment and in the second mode the one or more multiplexers provide input received by the second device segment to the redundant segment for in-service testing of the second device segment;
    one or more comparators configured to compare an output generated by the first device segment and an output generated by the redundant segment when the one or more multiplexers are configured in the first mode and compare an output generated by the second device segment and the output generated by the redundant segment when the one or more multiplexers are configured in the second mode; and one or more selectors configured to receive a determination from the one or more comparators and, based on the determination, select either the output generated by the first device segment or the output generated by the redundant segment when the one or more multiplexers are configured in the first mode, and select either the output generated by the second device segment or the output generated by the redundant segment when the one or more multiplexers are configured in the second mode.

13. The electronic circuit of claim 12, wherein the one or more selectors select the output generated by the first device segment when the determination from the one or more comparators indicate that the output generated by the first device segment matches the output generated by the redundant segment, and the one or more selectors select the output generated by the second device segment when the determination from the one or more comparators indicate that the output generated by the second device segment matches the output generated by the redundant segment.

14. The electronic circuit of claim 12, wherein the one or more selectors select the output generated by the redundant segment when the determination from the one or more comparators indicates that:

the output generated by the first device segment does not match the output generated by the redundant segment, or the output generated by the second device segment does not match the output generated by the redundant segment.

15. The electronic circuit of claim 12, wherein the one or more selectors cause the first device segment to be replaced by the redundant segment when the determination from the one or more comparators indicate that the output generated by the first device segment does not match the output generated by the redundant segment.

16. The electronic circuit of claim 12, wherein the one or more selectors cause generation of an alert when the determination from the one or more comparators indicate that the output generated by the first device segment does not match the output generated by the redundant segment.

17. The electronic circuit of claim 12, further comprising:

a second redundant segment, wherein in the first mode the one or more multiplexers provide input received by the first device segment to the second redundant segment for in-service testing of the first device segment and in the second mode the one or more multiplexers provide input received by the second device segment to the second redundant segment for in-service testing of the second device segment.

18. The electronic circuit of claim 17, wherein the one or more comparators are configured to:

compare the output generated by the first device segment, the output generated by the redundant segment, and an output generated by the second redundant segment when the one or more multiplexers are configured in the first mode, and compare the output generated by the second device segment, the output generated by the redundant segment, and the output generated by the second redundant segment when the one or more multiplexers are configured in the second mode.

19. The electronic circuit of claim 18, wherein:

the one or more selectors select the output generated by the first device segment when the determination from the one or more comparators indicates that the output generated by the first device segment matches either the output generated by the redundant segment or the output generated by the second redundant segment, and the one or more selectors select the output generated by the second device segment when the determination from the one or more comparators indicate that the output generated by the second device segment matches either the output generated by the redundant segment or the output generated by the second redundant segment.

20. The electronic circuit of claim 18, wherein the one or more selectors select the output generated by the redundant segment when:

the determination from the one or more comparators indicate that the output generated by the first device segment does not match the output generated by the redundant segment, or the output generated by the second device segment does not match the output generated by the redundant segment and the output generated by the redundant segment matches the output generated by the second redundant segment.

21. The electronic circuit of claim 12, further comprising:

a plurality of additional device segments, wherein the one or more multiplexers are continuously configured into different modes for in-service testing of the plurality of additional device segments.

22. The electronic circuit of claim 21, wherein the electronic circuit is implemented within an automotive system and the one or more multiplexers are continuously configured into different modes for in-service testing of the plurality of additional device segments during operation of the automotive system.

* * * * *